US011022760B2

(12) United States Patent
Brown et al.

(10) Patent No.: US 11,022,760 B2
(45) Date of Patent: Jun. 1, 2021

(54) PORTABLE INDUSTRIAL FIBER OPTIC INSPECTION SCOPE

(71) Applicant: nLIGHT, Inc., Vancouver, WA (US)

(72) Inventors: Aaron Brown, Vancouver, WA (US); Dahv A. V. Kliner, Portland, OR (US); Scott R. Karlsen, Battle Ground, WA (US); Jeremy Young, Beaverton, OR (US); Ryan Hawke, Vancouver, WA (US); David R. Balsley, Portland, OR (US); Ron Stevens, Vancouver, WA (US)

(73) Assignee: nLIGHT, Inc., Vancouver, WA (US)

( * ) Notice: Subject to any disclaimer, the term of this patent is extended or adjusted under 35 U.S.C. 154(b) by 966 days.

(21) Appl. No.: 15/143,314

(22) Filed: Apr. 29, 2016

(65) Prior Publication Data

US 2016/0320565 A1 Nov. 3, 2016

Related U.S. Application Data (60) Provisional application No. 62/154,701, filed on Apr. 29, 2015.

(51) Int. Cl.
  *G02B 6/38* (2006.01)
  *H04N 5/225* (2006.01)
  *G01M 11/00* (2006.01)
  *G06T 7/00* (2017.01)

(52) U.S. Cl.
  CPC ............. *G02B 6/385* (2013.01); *G01M 11/33* (2013.01); *G06T 7/0004* (2013.01); *H04N 5/2257* (2013.01); *G06T 2207/10152* (2013.01); *G06T 2207/30164* (2013.01); *H04N 5/2256* (2013.01)

(58) Field of Classification Search
  CPC ...................................................... G02B 6/385
  See application file for complete search history.

(56) References Cited

U.S. PATENT DOCUMENTS

| 7,023,532 | B2 | 4/2006 | Bengtsson et al. |
| 7,088,437 | B2 | 8/2006 | Blomster et al. |
| 8,189,278 | B2 | 5/2012 | Roos et al. |
| 9,052,467 | B2 | 6/2015 | Roos et al. |
| 9,134,171 | B2 | 9/2015 | Blomster et al. |
| 9,360,643 | B2 | 6/2016 | Rinzler et al. |
| 9,375,974 | B2 | 6/2016 | Ream et al. |

(Continued)

*Primary Examiner* — Tracy Y. Li
(74) *Attorney, Agent, or Firm* — Klarquist Sparkman, LLP (57) ABSTRACT

An apparatus includes a camera, a dark field illumination source, and a fiber inspection housing including a fiber connector input situated to receive an optical fiber connector so that an optical fiber output end of the optical fiber connector is removably insertable into an interior region of the fiber inspection housing and securable at a predetermined location in the interior region, a camera input situated to receive and secure the camera so that the camera is in optical communication with the interior region and the optical fiber output end, and a dark field illumination source input situated to receive the dark field illumination source so that light emitted from the dark field illumination source is received by the optical fiber output end at a dark field illumination angle and is scattered by contamination or defects associated with the optical fiber output end so as to be detectable by the camera.

24 Claims, 9 Drawing Sheets

(56) References Cited

U.S. PATENT DOCUMENTS

| | | | |
|---|---|---|---|
| 2002/0135871 A1* | 9/2002 | Vodyanoy | G01J 3/44 |
| | | | 359/389 |
| 2004/0125366 A1* | 7/2004 | Kiani | G02B 6/3807 |
| | | | 356/237.1 |
| 2006/0153503 A1* | 7/2006 | Suzuki | G02B 6/3807 |
| | | | 385/53 |
| 2012/0180298 A1* | 7/2012 | Castonguay | G02B 6/3846 |
| | | | 29/434 |
| 2013/0229650 A1* | 9/2013 | Wilson | B08B 1/00 |
| | | | 356/73.1 |
| 2015/0063756 A1* | 3/2015 | Hallett | G02B 6/3802 |
| | | | 385/78 |
| 2016/0178858 A1* | 6/2016 | Tong | G02B 6/3821 |
| | | | 385/78 |

* cited by examiner

PORTABLE INDUSTRIAL FIBER OPTIC INSPECTION SCOPE

CROSS REFERENCE TO RELATED APPLICATION

This application claims the benefit of U.S. Provisional Patent Application No. 62/154,701, filed Apr. 29, 2015, which is incorporated by reference herein in its entirety.

FIELD

The field is fiber optic inspection apparatuses and methods.

BACKGROUND

Conventional methods of inspecting and documenting an output end of industrial fibers used in fiber laser products are inconvenient or inadequate.

SUMMARY

According to representative examples of the disclosed technology, an apparatus includes a camera, a dark field illumination source, and a fiber inspection housing including a fiber connector input situated to receive an optical fiber connector so that an optical fiber output end of the optical fiber connector is removably insertable into an interior region of the fiber inspection housing and securable at a predetermined location in the interior region, a camera input situated to receive and secure the camera so that the camera is in optical communication with the interior region and the optical fiber output end, and a dark field illumination source input situated to receive the dark field illumination source so that light emitted from the dark field illumination source is received by the optical fiber output end at a dark field illumination angle and is scattered by contamination or defects associated with the optical fiber output end so as to be detectable by the camera.

According to representative method examples of the disclosed technology, an optical fiber inspection method includes receiving in a fiber inspection housing an optical fiber connector having an optical fiber axis so that an output fiber end is situated at a predetermined location in an interior region of the fiber inspection housing, bright field illuminating through the interior region of the fiber inspection housing at least one surface of the output fiber end and obtaining a first image of the at least one surface with a camera optically coupled to the output fiber end, and dark field illuminating through the interior region the at least one surface of the output fiber end and obtaining a second image of the at least one surface with the camera.

The foregoing and other objects, features, and advantages of the disclosed technology will become more apparent from the following detailed description, which proceeds with reference to the accompanying figures.

DETAILED DESCRIPTION

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections.

Figure 1A:
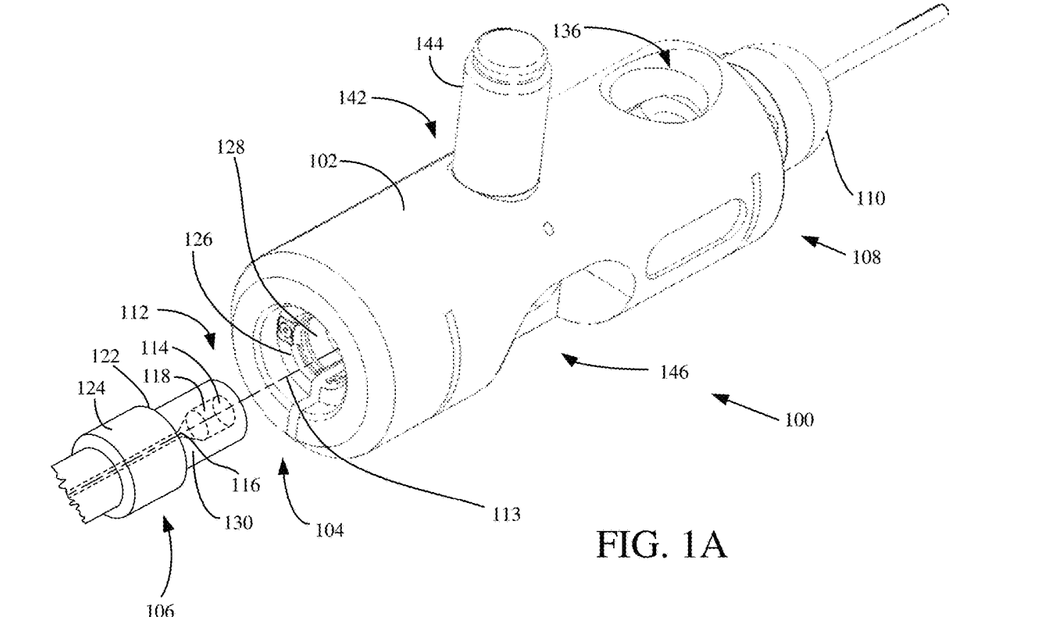
FIG. 1A is a perspective view of a fiber inspection tool.
Figure 1B:
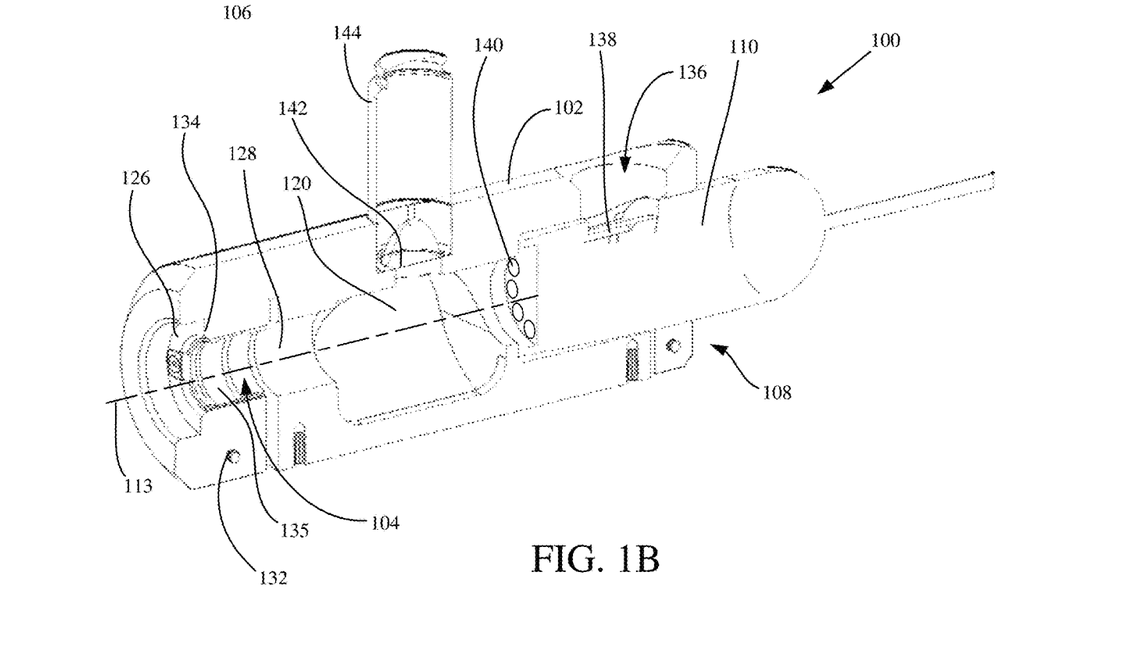
FIG. 1B is cross-sectional perspective view of the fiber inspection tool shown in FIG. 1A
Figure 1C:
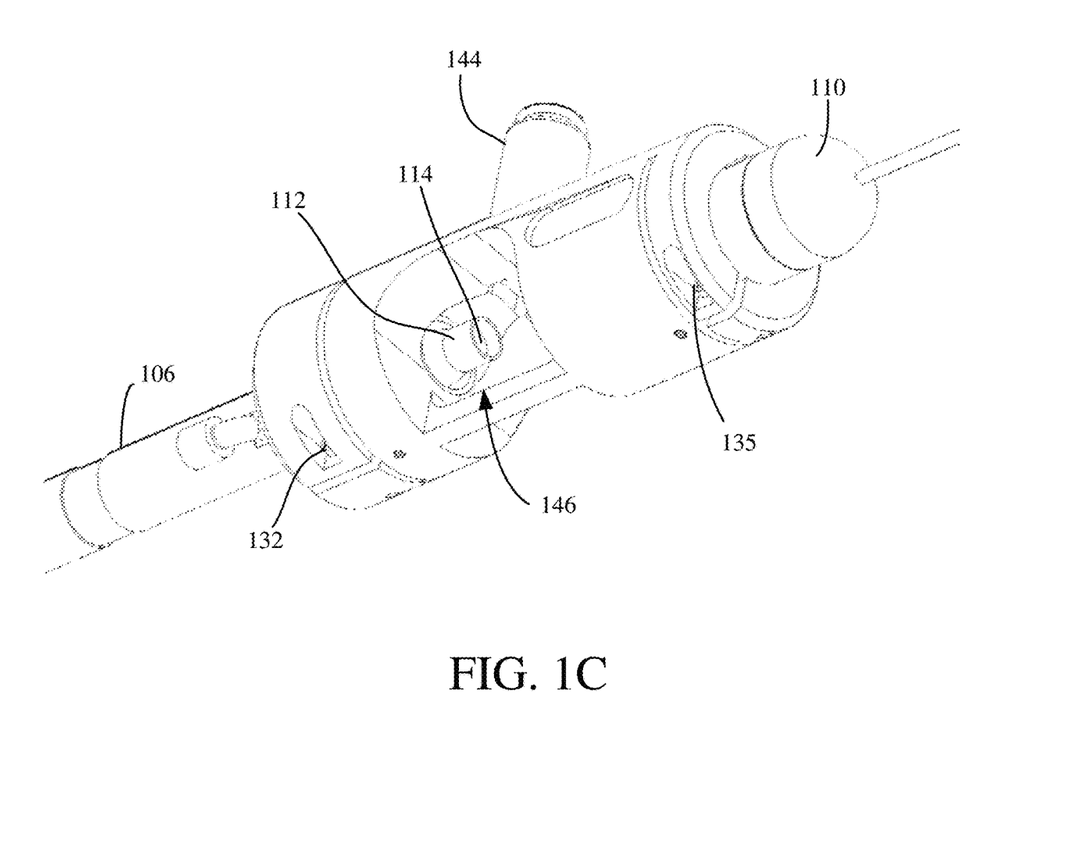
FIG. 1C is another perspective view of the fiber inspection tool shown in FIG. 1A.

FIGS. 1A-1C show a portable fiber inspection apparatus 100 that includes a plastic tubular housing 102 having an optical fiber connector input 104 situated to receive an optical fiber connector 106 and having a camera input 108 situated opposite the optical fiber connector input 104 so as to receive a camera 110 such as a USB camera. The optical fiber connector input 104 can be configured to receive the optical fiber connector 106 of various types, including common industrial laser connectors such as QBH, RQB, LLK-B, etc. In some examples, by using a non-conductive material for the housing 102, an interlock trigger associated with conductive contact with one or more surfaces of the optical fiber connector 106 can be inhibited, and an associated laser device will not inadvertently energize during inspection of the optical fiber connector 106.

The optical fiber connector 106 typically includes an optical fiber output end 112 that transmits an optical beam, such as a laser beam. The optical fiber output end 112 includes an output surface 114 that is circular and planar and made of glass or other suitable material that transmits the optical beam. An optical axis 113 extends along the optical fiber connector 106 and optical fiber output end 112 and is typically perpendicular to the output surface 114. The optical axis 113 corresponds to a propagation direction of the transmitted optical beam. In typical examples, the optical fiber output end 112 also includes an output fiber surface 116 coupled to an endcap 118 with the endcap 118 terminating at the output surface 114. Additional planar output surfaces of the optical fiber output end 112 can be formed with protective windows or filters interior or exterior to the endcap 118, or other surfaces within the endcap 118. During manufacture, assembly, or operation of the optical fiber connector 106 or a laser device coupled to the optical fiber connector 106, surfaces of the optical fiber output end can become contaminated, burned, improperly fabricated, or otherwise form defects that can be detrimental to laser operation.

An interior region 120 of the housing 102 extends between the optical fiber connector input 104 and the camera input 108 so as to provide an optical path between the optical fiber output end 112 and the camera 110. The optical fiber connector 106 is inserted into optical fiber connector input 104 and secured snugly so that the optical fiber output end can be positioned in the interior region 120 at a fixed or variable predetermined location. In some examples, a proximal surface 122 of a cylindrical protrusion 124 of the optical fiber connector 106 can register or contact a corresponding mating surface 126 on the optical fiber connector input 104 to axially position the inserted optical fiber connector 106 at the predetermined location in the interior region 120. A cylindrical bore 128 of the optical fiber connector input 104 can surround a corresponding cylindrical receiving surface 130 of the optical fiber connector 106 and a set screw 132 or other clamping mechanism can collapse the cylindrical bore 128 on the cylindrical receiving surface 130 for a snug fit of the optical fiber connector 106. In some examples, the mating surface 126 and cylindrical bore 128 can form part of a removable metal sleeve or cylindrical adapter 134 that can be inserted into the optical fiber connector input 104. A portion 135 of the removable cylindrical adapter 134 can be recessed to provide spaced region surrounding the optical fiber connector 106 so as to inhibit a laser interlock trigger in the optical fiber connector 106. In further examples, the removable cylindrical adapter 134 can be selected based on the type of optical fiber connector 106 to be inspected so that the optical fiber output end 112 is secured at the predetermined location in the interior region 120. Removal of the removable cylindrical adapter 134 can increase the diameter of the cylindrical bore 128, allowing insertion of optical fiber connectors with various protruding features. In some examples, the optical fiber connector 106 is clamped and secured in the interior region 120 against lateral translation, lateral and axial translation, or lateral and axial translation and rotation about the optical axis 113. In particular examples, rotation about the optical axis 113 during inspection of the optical fiber output end can facilitate inspection of various defects by moving the defects to a different azimuth that may have reduced optical speckle or noise during camera imaging. In further examples, the predetermined location can be variably adjusted, e.g., with a translation stage or translation mechanism.

The camera 110 is inserted into the camera input 108 and aligned with the optical axis 113 of the optical fiber connector 106. In typical examples, the camera 110 is positioned in the camera input 108 to be in view and a selected surface of the optical fiber output end 112, such as the output surface 114. The camera 110 can be secured with a set screw 135 that tightens the camera input 108 around features of the camera 110. An access port 136 can allow access to a camera adjust wheel 138 to adjust a camera setting, such as focus or magnification. In some examples, the camera 110 can be adjusted to focus at different distances so that separate surfaces of the optical fiber output end 112 may be inspected. The camera 110 or camera input 108 can include an on-axis illumination source 140, such as a plurality of light emitting diodes arranged around the camera 110, that directs bright field illumination coaxial with or parallel to the optical axis 113 so as to provide lighting for bright field illumination of the one or more selected surfaces of the optical fiber output end 112 viewed by the camera 110.

The housing 102 also has a dark field illuminator input 142 situated to receive an illumination source 144 so that the illumination source 144 directs light at a large angle to the optical axis 113, such as perpendicular, 80 degrees, 70 degrees, etc. In typical examples, the angle is selected so that specular reflections of light from the illumination source 144 are outside or predominantly outside the acceptance angle of the camera 110. In representative examples, the illumination source 144 includes one or more light emitting diodes operable to emit at the same or different wavelengths. The dark field light is received by the output surface 114 of the optical fiber output end 112 and becomes scattered by features on the output surface 114, such as dust particle contamination and chips, scratches, or other surface defects. The scattered dark field light propagates in various directions, including towards the camera 110 so that an image of the features of the optical fiber output end 112 can be formed. The on-axis illumination source 140 can be powered off during dark field illumination so that specular reflection is reduced and visibility increased for the features scattering the dark field light. The camera 110 can also obtain images of the output surface 114 through bright field illumination with the on-axis illumination source 140. Some types of defects can appear more readily or not at all during dark field or bright field illumination, allowing discrimination between defects and an improved indication of laser environmental or operational factors leading to the defects. A cleaning access port 146 provides access to the interior region 120 and the optical fiber output end 112 so that the output surface 114 or other exposed surfaces can be cleaned with a solvent, compressed gas, etc., during or after inspection.

Figure 2A:
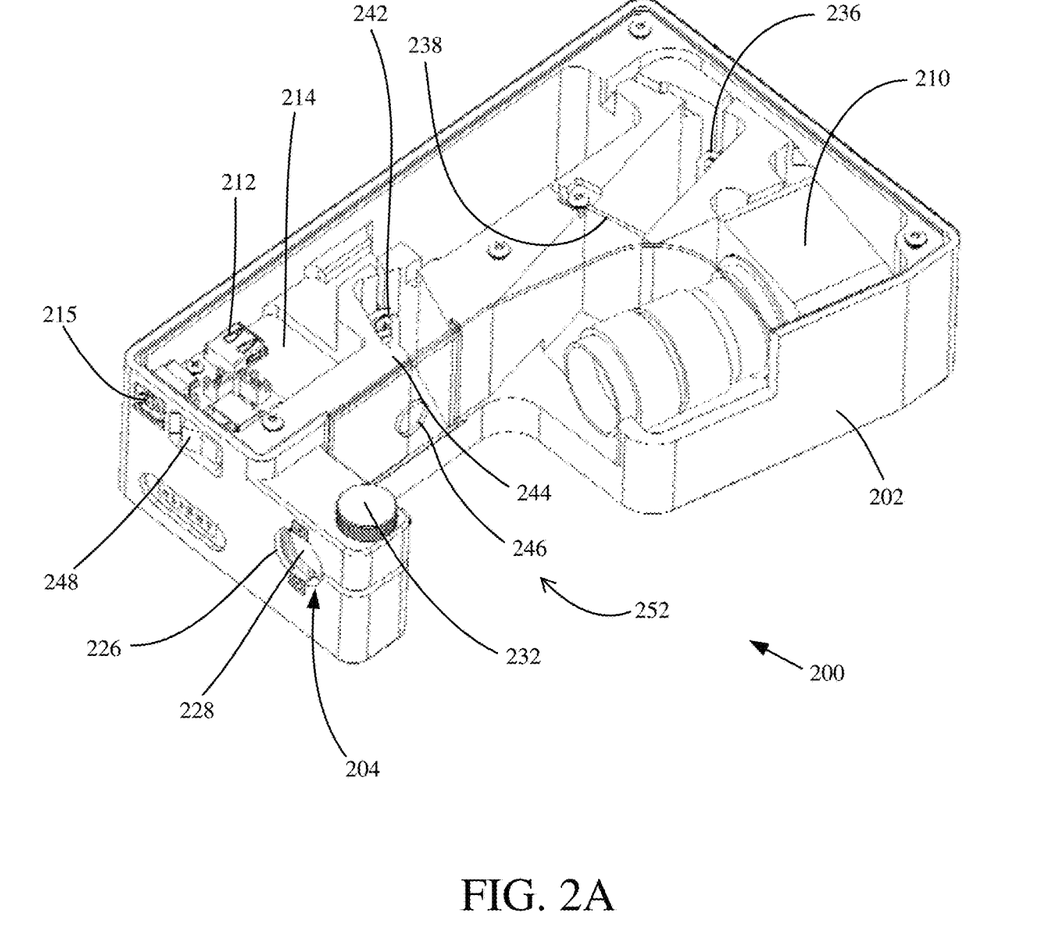
FIG. 2A is a perspective view of another fiber inspection tool.
Figure 2B:
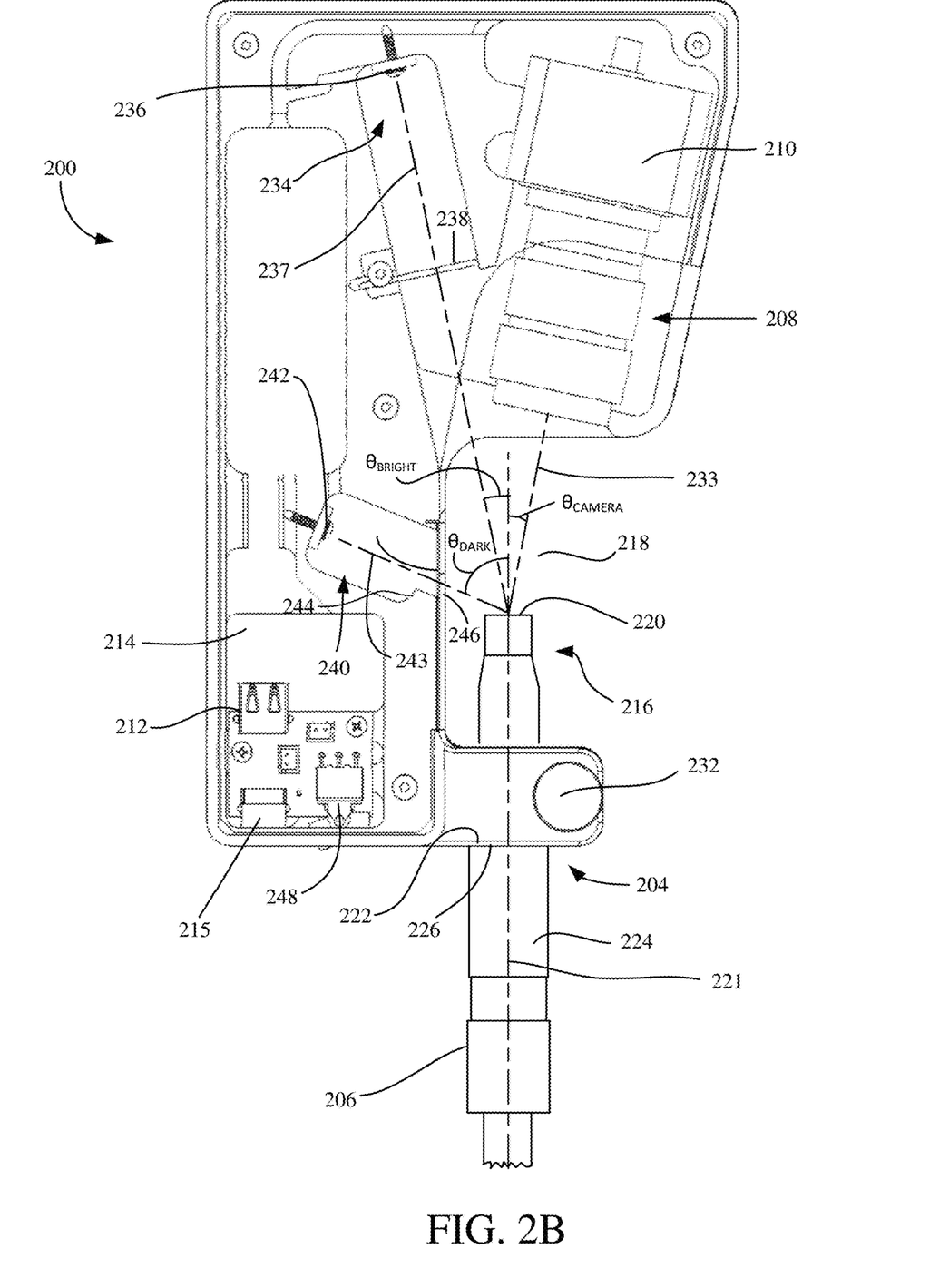
FIG. 2B is a plan view of the fiber inspection tool shown in FIG. 2A.
Figure 2C:
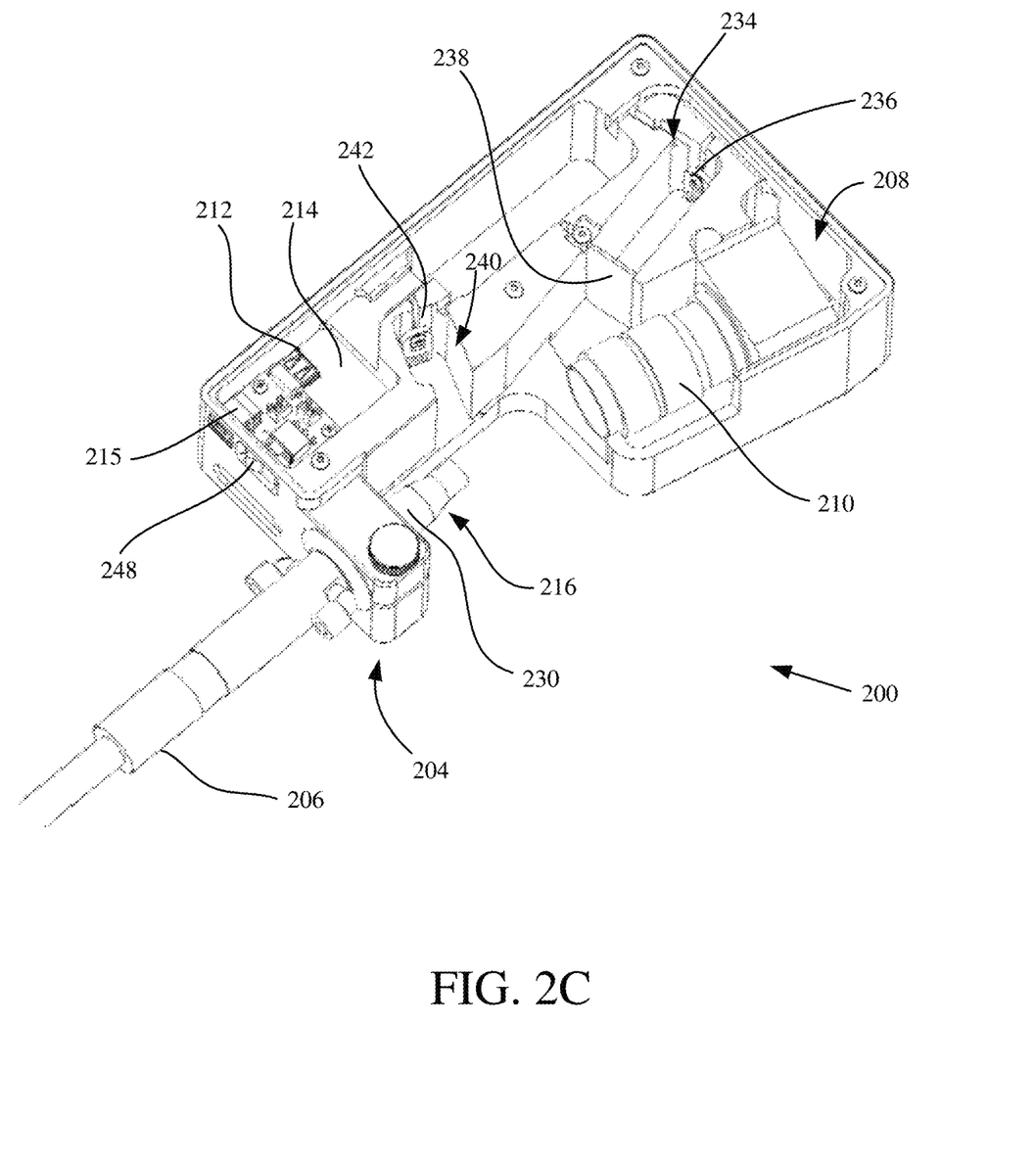
FIG. 2C is a perspective view of the fiber inspection tool shown in FIG. 2A.

FIGS. 2A-2C show a portable fiber inspection apparatus 200 that includes a plastic rectangular housing 202 having an optical fiber connector input 204 situated to receive an optical fiber connector 206 and a camera input 208 situated to receive a camera 210. The housing 202 can be 3D-printed and the various inputs of the housing 202 can be adapted to various connectors and off-the shelf components. In some examples, the camera 210 is a USB camera and a USB output of the camera 210 can be received at USB port 212 of an electrical board 214. The electrical board 214 includes an additional USB output 215 that can provide a data output for the camera 210 and can power the camera 210 and other devices in the housing 202, such as illuminator sources. The optical fiber connector 206 can be of various types, including as described above with respect to the optical fiber connector 106. The optical fiber connector 206 is inserted into the input 204 so that an optical fiber output end 216 can be secured in an interior region 218 of the housing 202 at a predetermined location or locations and in view of the camera 210.

The optical fiber output end 216 includes one or more optical surfaces, such as an output surface 220, for inspection, that are typically concentric about an optical axis 221 of the optical fiber connector 206. A detent, protrusion, thread, fluid piping inlet/outlet, or other feature, such as a top surface 222 of a cylindrical portion 224 of the optical fiber connector 206 can register against a registering surface 226 of the optical fiber connector input 204 so that the optical fiber connector 206 can be positioned at the predetermined location in the interior region 218. A cylindrical bore 228 of the optical fiber connector input surrounds a cylindrical portion 230 of the optical fiber connector 206 and a knobbed screw 232 allows the optical fiber connector input 204 to clamp the optical fiber connector 206 at the predetermined location. In some examples, the optical fiber connector 206 can freely or snugly rotate about the optical axis 221 during or between camera images.

The camera input 208 is situated to position a camera axis 233 of the camera 210 at an angle $\theta_{CAMERA}$ with respect to the optical axis 221. The angle $\theta_{CAMERA}$ is typically greater than zero degrees and allows less than perfect overlap between separate surfaces situated along the optical axis 221 of the optical fiber output end 216 as viewed by the camera 210. A bright field illuminator input 234 is situated adjacent to the camera input 208 and receives a bright field illuminator source 236 situated to direct light to the optical fiber output end 216. The bright field illuminator source 236 has a bright field illumination axis 237 that is situated at an angle $\theta_{BRIGHT}$ with respect to the optical axis 221. The angle $\theta_{BRIGHT}$ is typically greater than zero degrees and can be situated at the same or a similar angle as $\theta_{CAMERA}$ but opposite the optical axis 221. Suitable angles for $\theta_{CAMERA}$ and $\theta_{BRIGHT}$ can range from zero to forty-five degrees, though more typically from five to twenty degrees. In some examples, a diffuser 238 is situated to receive the light from the bright field illuminator source 236 and to spread and diffuse the bright field light that is incident on the optical fiber output end 216 so as to improve the imaging of defects and contamination by the camera 210 by providing an off-axis diffuse backlighting to the inspected surface. In some examples, the bright field illumination source 236 is an extended diffuse light source that completely fills or overfills an image of the output surface 220 on the camera 210 when the illumination is reflected at the output surface 220.

The housing 202 also includes a dark field illuminator input 240 situated to receive a dark field illuminator source 242. The dark field illuminator source 242 is situated to direct light to the optical fiber output end 216 along a dark field illumination axis 243 at a relatively large angle $\theta_{DARK}$ with respect to the optical axis 221. The dark field illumination axis 243 generally extends from a point on an inspected surface, such as output surface 220, to the dark field illumination source 242. In some examples the dark field illumination axis 243 corresponds to an emission axis of the dark field illumination source. The $\theta_{DARK}$ provides a corresponding shallow angle of incidence with respect to a surface to be inspected, such as the output surface 220 of the optical fiber output end 216, so that the dark field light is scattered by contamination or defects on the inspected surface and detected by the camera 210. In some examples, a baffle 244 extends from the housing 202 from the side of the dark field illumination axis 243 nearer to the optical fiber output end 216 and into the propagation path of the dark field light that is propagating to the output surface 220. The baffle 244 blocks a portion of the dark field light so as to limit the incidence of light into the optical fiber output end 216 that would otherwise reduce the quality of the dark field image obtained by the camera 210. An aperture 246 is situated adjacent to the baffle 244 and further blocks a portion of the dark field light propagating to the output surface 220. In some examples, the aperture 246 can be shaped to block a portion of light similar to the baffle 244. The aperture 246 can slidably engage the housing 202 so that slides having different apertures can be used for different optical fiber connectors.

A switch 248 is situated to select between the bright field illuminator source 236 and the dark field illuminator source 242 based on the selected camera imaging operation. In typical examples $\theta_{DARK}$ is a fixed angle that is selected to be greater than 60 degrees, greater than 70 degrees, or greater than 80 degrees. In further examples, the $\theta_{DARK}$ varies with a movable dark field illuminator source or with multiple dark field illuminator sources arranged to direct dark field at different angles $\theta_{DARK}$ with respect to the optical axis 221. In additional examples, the wavelength of the dark field light or the bright field light can be varied to improve resolution or detection of contamination and defects, such as with different emission wavelengths or one or more spectral filters. In some examples, the optical axis 221, the camera axis 233, the bright field illumination axis 237, and the dark field illumination axis 243 do not lie in a common plane. The interior region 218 provides a cleaning volume 252 that allows access without obstruction from three sides of the optical fiber output end 216.

Figure 3A:
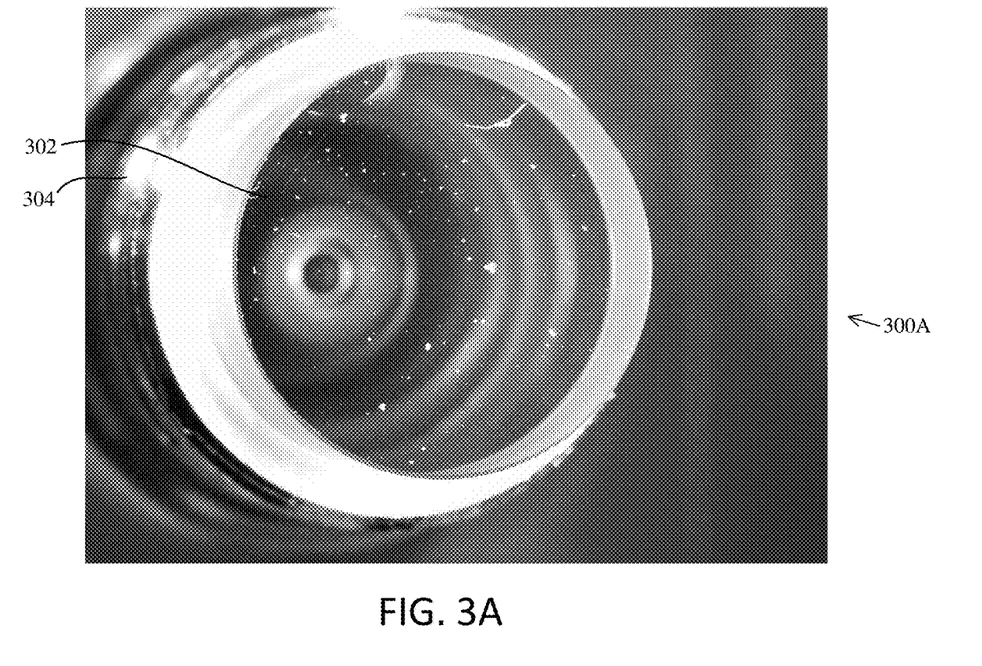
FIG. 3A is an image of a dark field illuminated optical fiber connector end.
Figure 3B:
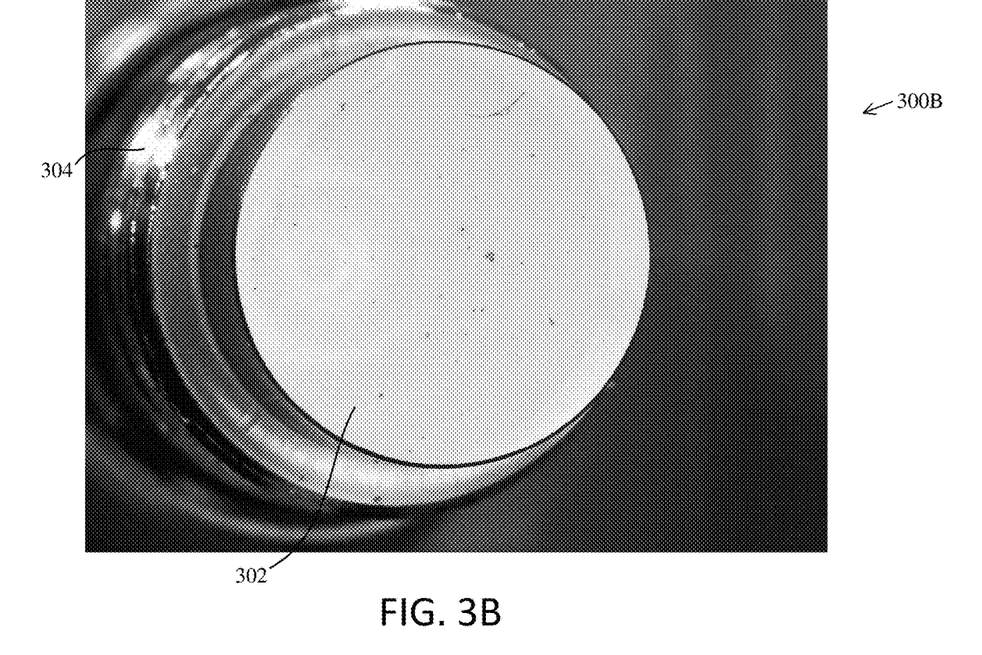
FIG. 3B is an image of a bright field illuminated optical fiber connector end.
Figure 4A:
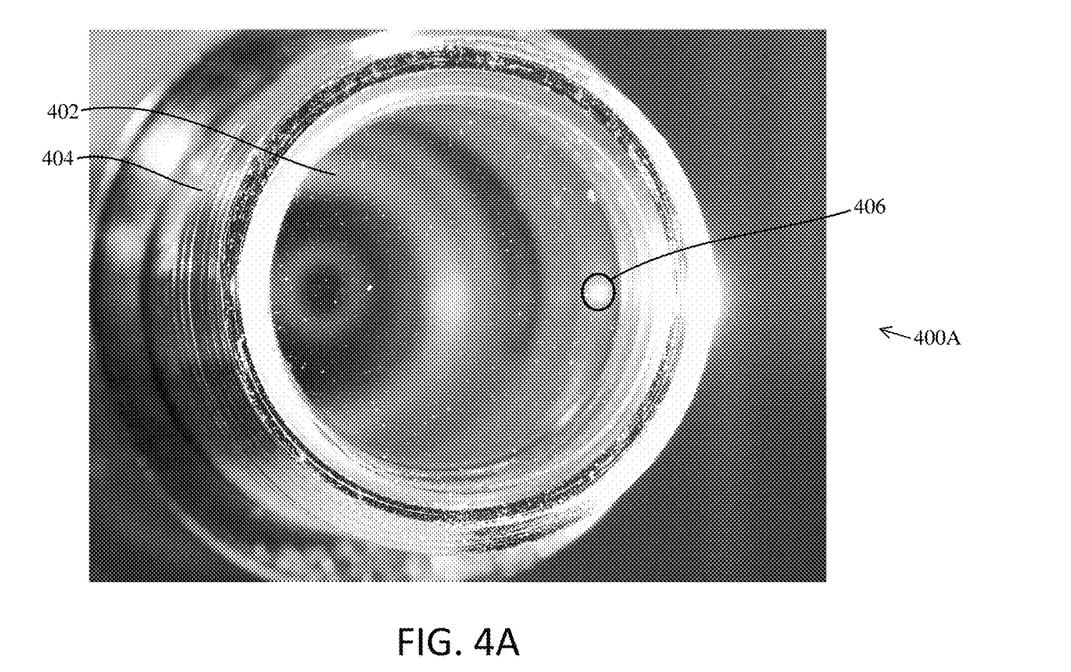
FIG. 4A is an image of another dark field illuminated optical fiber connector end.
Figure 4B:
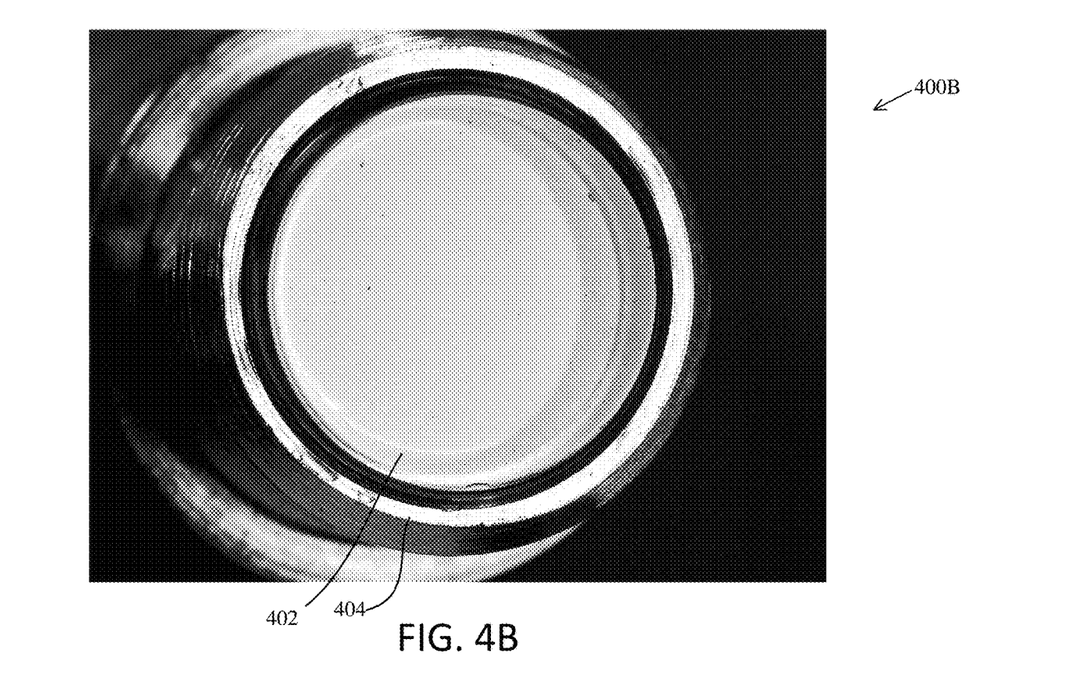
FIG. 4B is an image of another bright field illuminated optical fiber connector end.

FIGS. 3A and 3B show a dark field image 300A and a bright field image 300B, respectively, for an output surface 302 of an optical fiber connector output end 304. The dark field illumination in the dark field image 300A causes defects of the output surface 302 to appear brighter than the surrounding interior of the optical fiber connector output end 304. In the bright field image 300B, bright field illumination reflects off the output surface 302 and various surfaces of the interior of the optical fiber connector output end 304 and is absorbed or shadowed to reveal dark spots associated with defects of the output surface 302. FIGS. 4A and 4B show a dark field image 400A and a bright field image 400B, respectively, for an output surface 402 of an optical fiber connector output end 404 of a different type than optical fiber connector output end 304. For defects overlapping a bright spot 406, the optical fiber connector output end 404 can be rotated and re-imaged so as to improve image contrast and surface defect detail. Burns and coating defects can be seen more effectively with off-angle diffuse bright field illumination. Furthermore, defects, contamination, and damage on coated optics often produces color variation of reflected light that can be detected with a color camera.

Figure 5:
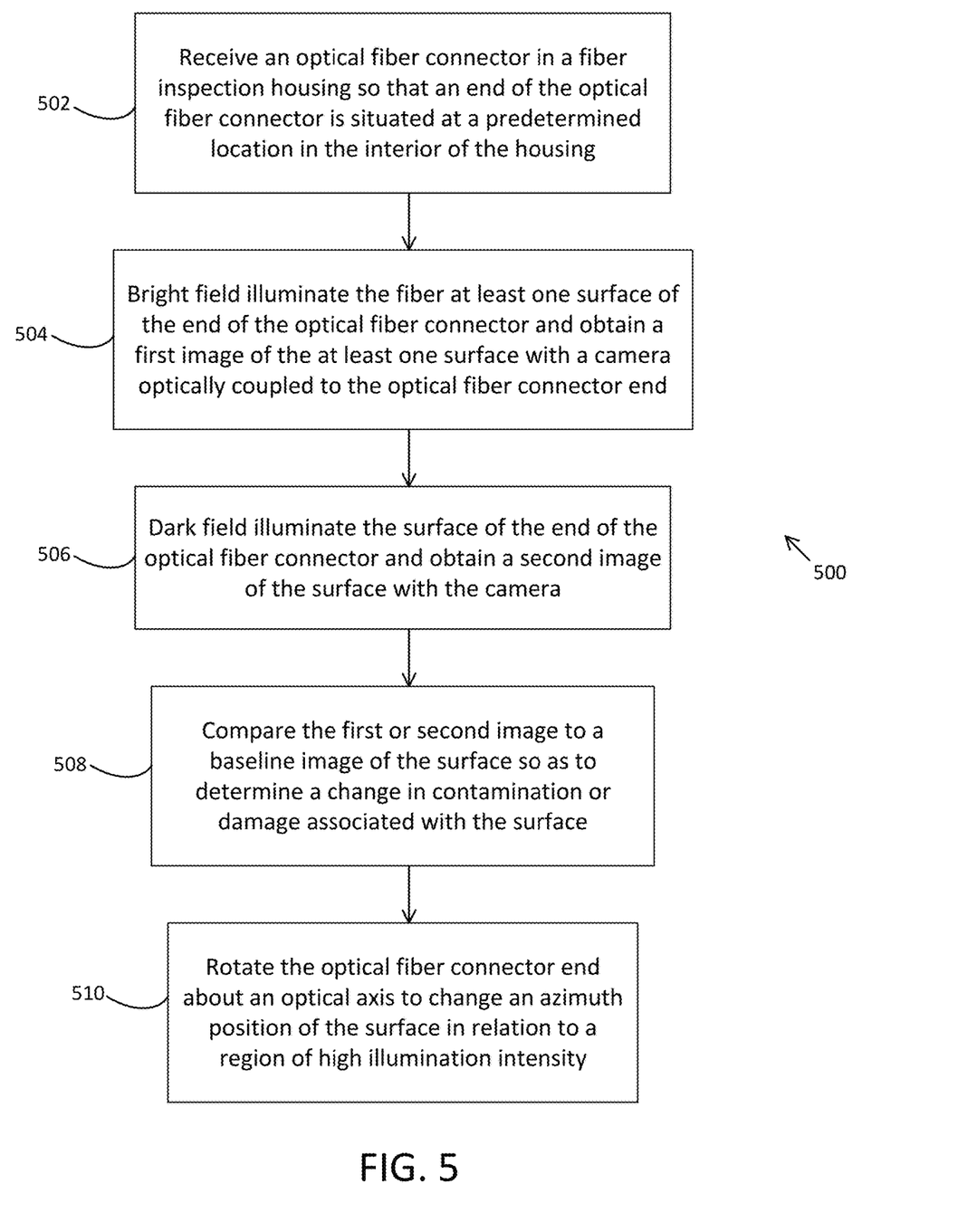
FIG. 5 is a flowchart of a method of fiber inspection.

FIG. 5 depicts an example of a method 500 for inspecting an optical fiber for contamination or defects. The method 500 includes, at a method act 502, receiving in a fiber inspection housing an optical fiber connector having an optical fiber axis so that an output fiber end is situated at a predetermined location in an interior region of the fiber inspection housing. In typical examples, the fiber inspection housing is portable so that inspection and imaging can be performed in situ. At a method act 504, the interior of the fiber inspection housing and at least one surface of the output fiber end of the optical fiber connector are bright field illuminated with a bright field illumination source. A camera obtains a bright field image of illuminated surface so that contamination or defects can be revealed. At a method act 506, the interior of the fiber inspection housing and the at least one surface of the output fiber end of the optical fiber connector are dark field illuminated with a dark field illumination source. The camera obtains a dark field image of the illuminated surface that also reveals contamination and defects on the surface. The obtained images can be recorded on a memory, computer readable medium, web storage location, etc., and stored for subsequent use, comparison, or manipulation. At a method act 508, the bright field image or the dark field image (or both) is compared to a baseline image of the surface in order to determine a change in contamination or damage to the surface. For example, after usage of the laser device in a field environment, a comparison can be made to determine the extent usage has affected optical surface quality. At a method act 510, the optical fiber connector end is rotated about an optical axis to change an azimuth position of the inspected surface in relation to a region of the imaged surface of high illumination intensity.

Figure 6:
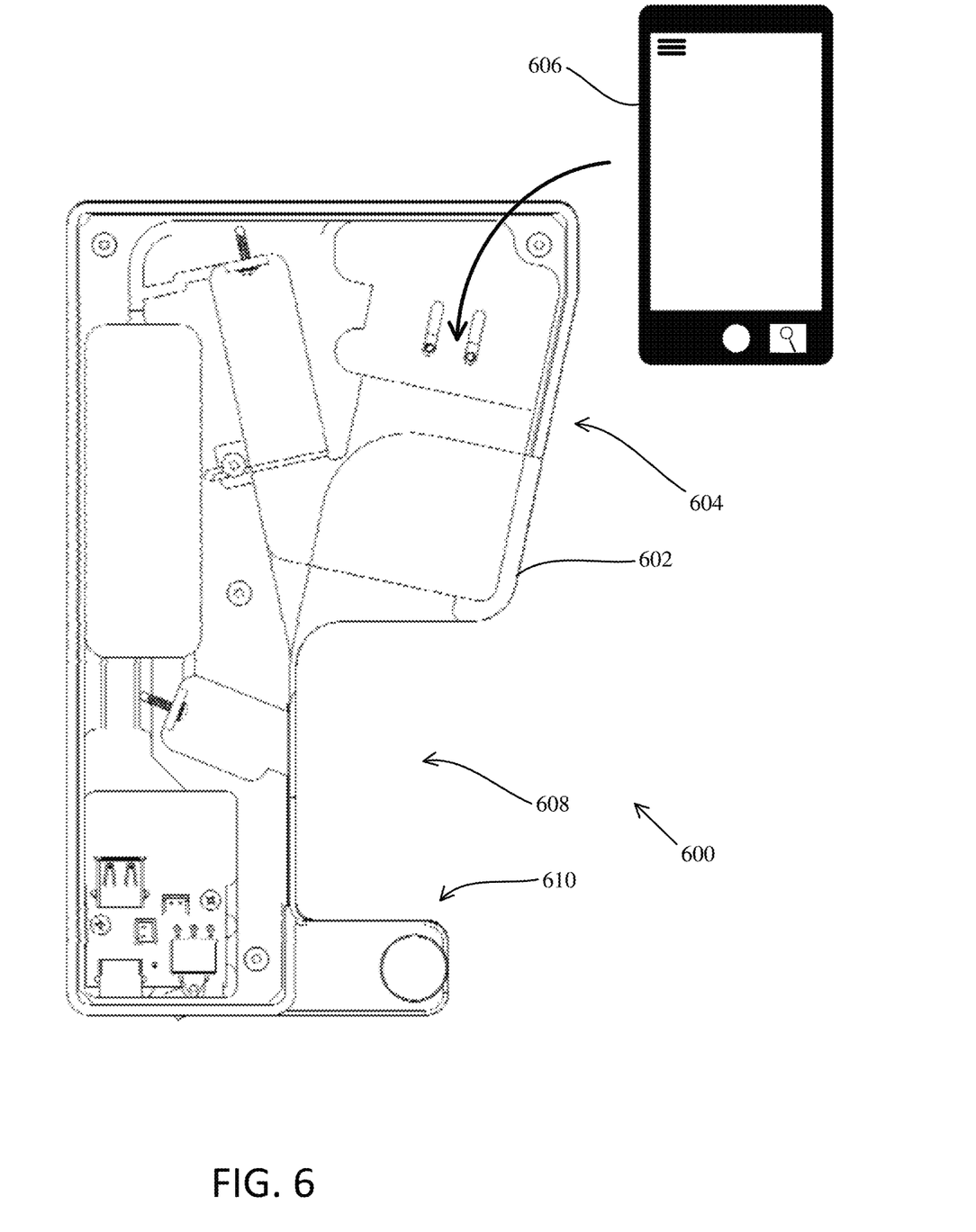
FIG. 6 is a plan view of another fiber inspection tool compatible with a mobile device.

In FIG. 6, an example of a fiber inspection apparatus 600 includes a fiber inspection housing 602 having a camera input 604 situated to receive a mobile device 606. The mobile device can be any of a variety of computing devices (e.g., cell phone, smartphone, handheld computer, Personal Digital Assistant (PDA), etc.) and can allow wireless two-way communications with one or more mobile communications networks 104, such as a cellular or satellite network. The mobile device 606 includes a camera that is positioned in the camera input 604 so as to be in optical communication with an output end of an optical fiber connector (not shown) situated in an interior region 608 and secured with an optical fiber connector input 610. The camera input 604 can include one or more variable slots or receiving portions to receive the mobile device 606 that can vary in size, dimension, and camera position.

In view of the many possible embodiments to which the principles of the disclosed technology may be applied, it should be recognized that the illustrated embodiments are only representative examples and should not be taken as limiting the scope of the disclosure. Alternatives specifically addressed in these sections are merely exemplary and do not constitute all possible alternatives to the embodiments described herein. For instance, various components of systems described herein may be combined in function and use. We therefore claim all that comes within the scope and spirit of the appended claims.

We claim:

1. An apparatus, comprising:
   a camera;
   a dark field illumination source;
   a fiber inspection housing including a fiber connector input situated to receive an optical fiber connector so that an optical fiber output end of the optical fiber connector is removably insertable into an interior region of the fiber inspection housing and securable at a predetermined location in the interior region, a camera input situated to receive and secure the camera so that the camera is in optical communication with the interior region and the optical fiber output end, and a dark field illumination source input situated to receive the dark field illumination source so that light emitted from the dark field illumination source is received by the optical fiber output end at a dark field illumination angle and is scattered by contamination or defects associated with the optical fiber output end so as to be detectable by the camera; and
   a bright field illumination source coupled to the fiber inspection housing and situated to illuminate the optical fiber output end so that contamination or defects associated with the optical fiber output end are detectable by the camera;
   wherein the bright field illumination source is spaced apart from the camera on the opposite side of an optical axis of the fiber connector input and situated to direct a bright field illumination along an optical axis that is at an oblique angle with respect to an optical axis of the camera.

2. The apparatus of claim 1, further comprising the optical fiber connector inserted into and secured in the interior region of the fiber inspection housing with the optical fiber output end is situated to receive light from the dark field illumination source.

3. The apparatus of claim 1, wherein the dark field illumination angle is greater than or equal to 30 degrees and less than or equal to 90 degrees between an optical axis of the optical fiber output end and a dark field illumination source axis.

4. The apparatus of claim 1, wherein the fiber connector input is situated to receive and secure the optical fiber output end at the predetermined location so that the optical fiber output end is rotatable about an optical fiber axis.

5. The apparatus of claim 1, wherein the fiber inspection housing includes a cleaning access port situated to allow cleaning of the optical fiber output end situated at the predetermined location in the interior region.

6. The apparatus of claim 1, further comprising a baffle situated to block at least a portion of the light emitted by the dark field illumination source that propagates at greater than the dark field illumination angle or that propagates to surfaces other than the optical fiber output end.

7. An apparatus, comprising:
   a camera;
   a dark field illumination source;
   a fiber inspection housing including a fiber connector input situated to receive an optical fiber connector so that an optical fiber output end of the optical fiber connector is removably insertable into an interior region of the fiber inspection housing and securable at a predetermined location in the interior region, a camera input situated to receive and secure the camera so that the camera is in optical communication with the interior region and the optical fiber output end, and a dark field illumination source input situated to receive the dark field illumination source so that light emitted from the dark field illumination source is received by the optical fiber output end at a dark field illumination angle and is scattered by contamination or defects associated with the optical fiber output end so as to be detectable by the camera; and
   a diffuser situated to diffuse light from a bright field illumination source so as to improve a camera image detail.

8. The apparatus of claim 1, wherein the fiber inspection housing is made of a plastic or other non-conductive material so as to inhibit an interlock trigger associated with contact between one or more surfaces of the optical fiber connector and the fiber inspection housing.

9. The apparatus of claim 1, wherein the fiber connector input includes a metal sleeve insert having a recessed portion so as to provide a gap between the metal sleeve and an interlock contact of the optical fiber connector.

10. The apparatus of claim 1, wherein the camera is part of a mobile device, and the camera input is situated to receive the mobile device so that the mobile device camera is removably insertable into the camera input so as to detect defects on the optical fiber output end.

11. The apparatus of claim 1, wherein the fiber inspection housing is portable so that an image of the optical fiber output end with the camera is obtainable without requiring the mounting of the fiber inspection housing to a surface.

12. An apparatus, comprising:
a camera;
a dark field illumination source;
a fiber inspection housing including a fiber connector input situated to receive an optical fiber connector so that an optical fiber output end of the optical fiber connector is removably insertable into an interior region of the fiber inspection housing and securable at a predetermined location in the interior region, a camera input situated to receive and secure the camera so that the camera is in optical communication with the interior region and the optical fiber output end, and a dark field illumination source input situated to receive the dark field illumination source so that light emitted from the dark field illumination source is received by the optical fiber output end at a dark field illumination angle and is scattered by contamination or defects associated with the optical fiber output end so as to be detectable by the camera; and
a bright field illumination source coupled to the fiber inspection housing and situated to illuminate the optical fiber output end so that contamination or defects associated with the optical fiber output end are detectable by the camera;
wherein the bright field illumination source is adjacent to or adjoining the camera and situated to direct a bright field illumination along an optical axis as emitted from the bright field illumination source that is spaced apart and parallel to an optical axis of the camera.

13. An optical fiber inspection method, comprising:
removably receiving in an optical fiber connector input of a fiber inspection housing an optical fiber connector having an optical fiber axis so that an output fiber end of the optical fiber connector is situated at a predetermined location in an interior region of the fiber inspection housing;
securing the optical fiber connector in the fiber inspection housing against axial and lateral translation with respect to the optical fiber axis;
rotating the optical fiber connector;
bright field illuminating through the interior region of the fiber inspection housing at least one surface of the output fiber end and obtaining a first image of the at least one surface with a camera optically coupled to the output fiber end through the interior region; and
dark field illuminating through the interior region the at least one surface of the output fiber end and obtaining a second image of the at least one surface with the camera.

14. The optical fiber inspection method of claim 13, further comprising:
comparing one or both of the first image and second image to one or more baseline images of the output fiber end so as to determine a change in contamination or damage associated with the output fiber end.

15. The optical fiber inspection method of claim 13, wherein the dark field illuminating includes directing illumination light at an angle of incidence of greater than or equal to 60 degrees with respect to the optical fiber axis into the interior region so as to illuminate the at least one surface.

16. The optical fiber inspection method of claim 13, further comprising:
diffusing the directed dark field illumination light with a diffuser and blocking a portion of the diffused light with a baffle so as to reduce the amount of dark field light directed to the output fiber end at a smaller angle with the optical fiber axis.

17. The optical fiber inspection method of claim 13, wherein the bright field illuminating includes directing the illumination light at an angle from parallel to less than or equal to 45 degrees with respect to the optical fiber axis into the interior region so as to illuminate the at least one surface.

18. The optical fiber inspection method of claim 17, wherein the angle is greater than or equal to 5 degrees and less than or equal to 30 degrees with the optical fiber axis.

19. The optical fiber inspection method of claim 13, wherein the camera is situated opposite the bright field illumination source with respect to the optical fiber axis.

20. The optical fiber inspection method of claim 13, wherein the camera includes a plurality of adjacently situated lights so as to provide on-axis illumination of the at least one surface.

21. The optical fiber inspection method of claim 13, further comprising:
focusing the camera on a separate surface of the output fiber end and obtaining a separate surface image of the separate surface.

22. The optical fiber inspection method of claim 13, further comprising:
cleaning an end surface of the output fiber end with the optical fiber connector secured in the fiber inspection housing.

23. The optical fiber inspection method of claim 13, further comprising:
receiving a camera in the fiber inspection housing, wherein the camera is a mobile device camera.

24. The optical fiber inspection method of claim 13, further comprising varying the wavelength of the dark field illumination light or bright field illumination light received by the at least one surface so as to change an image detail associated with the at least one surface.

* * * * *